United States Patent [19]
Brown et al.

[11] Patent Number: 5,913,208
[45] Date of Patent: Jun. 15, 1999

[54] IDENTIFYING DUPLICATE DOCUMENTS FROM SEARCH RESULTS WITHOUT COMPARING DOCUMENT CONTENT

[75] Inventors: Eric William Brown, New Fairfield, Conn.; John Martin Prager, Ramsey, N.J.

[73] Assignee: International Business Machines Corporation, Armonk, N.Y.

[21] Appl. No.: 08/677,059

[22] Filed: Jul. 9, 1996

[51] Int. Cl.$^6$ .................................................. G06F 17/30
[52] U.S. Cl. ...................................................... 707/3; 707/5
[58] Field of Search ................................... 707/1, 2, 3, 4, 707/5, 6, 7, 200, 10, 101

[56] References Cited

U.S. PATENT DOCUMENTS

| | | | |
|---|---|---|---|
| 4,811,217 | 3/1989 | Tokizane et al. | 364/300 |
| 5,371,852 | 12/1994 | Attanasio et al. | 395/200.75 |
| 5,483,650 | 1/1996 | Pedersen et al. | 395/600 |
| 5,524,240 | 6/1996 | Barbara et al. | 395/600 |
| 5,550,976 | 8/1996 | Henderson et al. | 395/200.06 |
| 5,608,904 | 3/1997 | Chaudhuri et al. | 395/602 |
| 5,619,692 | 4/1997 | Malkemus | 395/602 |
| 5,634,051 | 5/1997 | Thomson | 395/605 |
| 5,659,729 | 8/1997 | Nielsen | 395/603 |
| 5,701,469 | 12/1997 | Brandli et al. | 395/613 |
| 5,704,060 | 12/1997 | Del Monte | 395/600 |

FOREIGN PATENT DOCUMENTS

| | | |
|---|---|---|
| 722 145 | 7/1996 | European Pat. Off. . |
| 747 839 | 11/1996 | European Pat. Off. . |
| 813 158 | 12/1997 | European Pat. Off. . |

OTHER PUBLICATIONS

Ed Bott "Using Windows 95" pp. 26–28, 1995.
Doermann et al., "The Detection of Duplicates in Document Image Databases" IEEE Databases, 1997, pp. 314–318.
Abdelguerfi et al. "Computational Complexity of Sorting and Joining Relations with Duplicates" IEEE Transactions on Knowledge and Data Engineering, vol. 3, No. 4, Dec. 1991, pp. 496–503.
Miller "Detecting Duplicates: A Searcher's Dream Come True" Online, Jul. 1990, pp. 27–34.
"Introduction to Information Storage and Retrieval Systems", W.B. Frakes, Software Engineering Guild, Stering, VA, 22170, pp. 1–12 (Chapter 1 of Information Retrieval Data Structures and Algorithms, Prentice Hall, Englewood Cliffs, NJ 07632).
"Introduction to Data Structures and Algorithms Related to Information Retrieval", R.A. Baeza–Yates, Universidad de Chili, Casilla 2777, Santiago, Chile, pp. 13–27 (Chapter 2 of Information Retrieval Data Structures and Algorithms, Prentice Hall, Englewood Cliffs, NJ 07632).

*Primary Examiner*—Wayne Amsbury
*Assistant Examiner*—Michael J. Wallace, Jr.
*Attorney, Agent, or Firm*—Louis J. Percello; Whitham, Curtis & Whitham

[57] ABSTRACT

A computer system has a document collection of one or more documents and one or more indexes that each include an inverted file with one or more terms. Each of the terms is associated with one or more document identifiers. The index further includes a document catalog that associates each of the document identifiers with one or more attributes, either intrinsic or non intrinsic. A search engine process produces a hit list having one or more hit list entries. Each hit list entry, with one or more hit list attributes, is associated with one of the documents that is determined by the search engine to be relevant to the query. A formatter processor selects one or more of the hit list attributes, identified by a hit list attribute selector and then compares the selected attributes of two or more entries on the hit list to determine whether or not documents associated with these entries are duplicate instances of one another. The determination can be made without examining the content of the document associated with the entries.

35 Claims, 10 Drawing Sheets

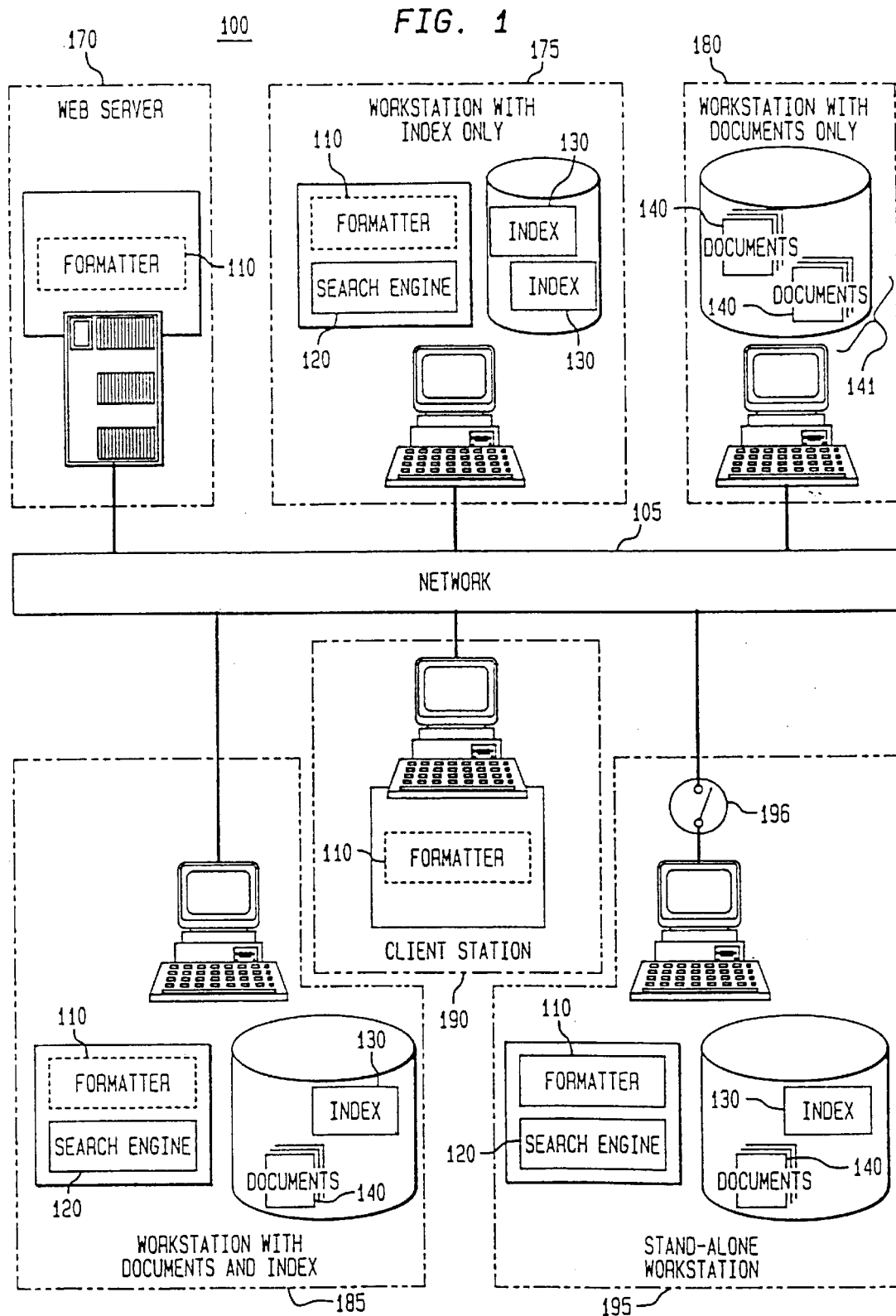

FIG. 3A

QUERY ELEMENTS — 310

| EFFECTS OF ACID RAIN ON CUCUMBER FARMING |
|---|

300 — QUERY

FIG. 3B

ATTRIBUTES — 360

| SCORE | ENTRY NUMBER | TITLE 366 | ... | SIZE | ... | LOC | ... | DUP |
|---|---|---|---|---|---|---|---|---|
| 93 | | "HEAVY RAINS FLOOD FARMS IN MID-WEST" | | 4.5K | | http://www.farmers.com/~brown/news/624.html | | |
| 93 | | "HEAVY RAINS FLOOD FARMS IN MID-WEST" | | 4.5K | | http://www.farmnews.com/news/1994/may/624.html | | |
| 93 | | "HEAVY RAINS FLOOD FARMS IN MID-WEST" | | 4.5K | | http://www.farmnews.com/news_mirror/1994/may/624.html | | |
| 79 | | "CUCUMBER FARMING HANDBOOK" | | 15.3K | | http://www.cucumbers.org/cfh.html | | |
| ... | ... | ... | | ... | | ... | ... | |
| 52 | | "EMISSIONS CONTROLS LESSEN ACID RAINS" | | 5.2K | | http://www.envnet.org/pollution/air/emissions.html | | |

370 / 280 (INTRINSIC)   380 / 220 (NON-INTRINSIC)

350 — HIT LIST

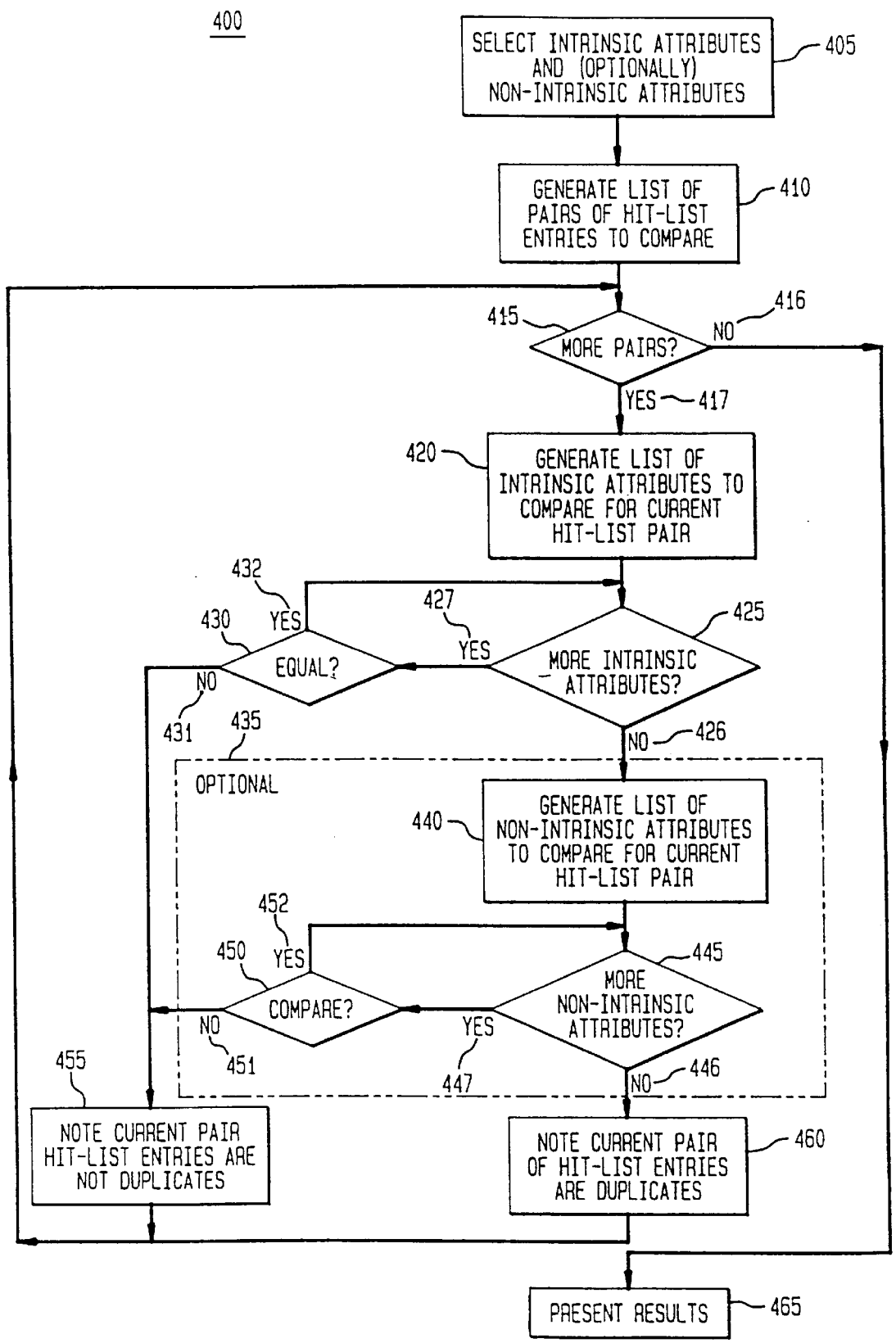

IDENTIFYING DUPLICATE DOCUMENTS FROM SEARCH RESULTS WITHOUT COMPARING DOCUMENT CONTENT

FIELD OF THE INVENTION

This invention relates to the field of searching large document databases, particularly in a networking environment. More specifically, the invention relates to a system and method for identifying duplicate documents from search results without comparing content within the document.

BACKGROUND OF THE INVENTION

A large document database is a collection of many documents (e.g., reports, articles, memos, books) stored electronically as files on one or more computers. Users access the database to locate documents of interest and retrieve those documents for further processing. Finding documents of interest by inspecting every document in the database is impractical. Instead, a search system is used to locate relevant documents. A search system allows a user to express an information need in the form of a query. The system's search engine processes the query and returns to the user a hit-list of relevant documents. The user then selects interesting documents from the hit-list and retrieves those documents.

Users typically want to search the document database based on the content of the documents. This is accomplished using an information retrieval (IR) system. See Salton and McGill, "Introduction to Modern Information Retrieval" McGraw-Hill, N.Y., 1983; Frakes and Baeza-Yates, "Information Retrieval: Data Structures & Algorithms", Prentice Hall, Englewood Cliffs, N.J., 1992, which is herein incorporated by reference in its entirety. An IR system identifies relevant documents by matching the information need described by the query with the information content of the documents in the database. A query can be constructed in a variety of ways. Free-text queries contain natural language sentences or phrases. Structured queries consist of terms combined with operators (e.g., Boolean, proximity). Example queries are entire documents that serve as examples of the desired information.

The information content of the documents is identified at indexing time when the search system processes the documents to build an index. One index commonly used by IR systems is an inverted file. An inverted file contains an inverted list for every term used in the document database. A term is any word or vocabulary item identified in a document during indexing. An inverted list identifies the documents that contain the corresponding term. A document entry in an inverted list may additionally contain a term weight (e.g., the number of times the term occurs in the document) and/or the location of each occurrence of the term in the document (e.g., paragraph, sentence, word offset).

The actual content of the index depends on a similarity algorithm used by a search engine. During query processing, the search engine obtains information from the index based on the query, processes the information according to its similarity algorithm, and generates a hit-list. The hit-list identifies the documents deemed relevant to the query. Each entry on the hit-list uniquely identifies the corresponding document and may be supplemented with one or more of the document's attributes. Document attributes include items such as title, author, creation date, length, location, etc. These are identified at indexing time and stored in a document catalog.

In addition to identifying which documents should appear on the hit-list, many systems calculate a relevance score for each document and rank the hit-list in decreasing order of relevance. The relevance score may be viewed as another document attribute, although it is calculated at query processing time and applicable only to the current query.

In a networking environment, the components of a document database system may be spread across multiple computers. A computer comprises a Central Processing Unit (CPU), main memory, disk storage, and software (e.g., a personal computer (PC) like the IBM ThinkPad). A networking environment consists of two or more computers connected by a local or wide area network (e.g., Ethernet, Token Ring, and the Internet.) (See for example, U.S. Pat. No. 5,371,852 to Attanasio et al. issued on Dec. 6, 1994 which is herein incorporated by reference in its entirety.) A user accesses the document database using a client application on the user's computer. The client application communicates with a search server (the document database search system) on either the user's computer (e.g. a client) or another computer (e.g. a server) on the network. To process queries, the search server needs to access just the database index, which may be located on the same computer as the search server or yet another computer on the network. The actual documents in the database may be located on any computer on the network.

A Web environment, such as the World Wide Web, is a networking environment where Web servers and browsers (e.g., Netscape and WebExplorer) are used. Users can make documents publicly available in a Web environment by registering the documents with a Web server. Other users in the Web environment can then retrieve these documents using a Web browser. The collection of documents retrievable in a Web networking environment can be viewed as a large document database.

To create an index for such a document database so that it may be searched, the prior art often uses Web wanderers, also called robots, spiders, crawlers, or worms (e.g., WebCrawler, WWWWorm), to gather the available documents and submit them to the search system indexer. Web wanderers make use of hypertext links stored in documents. A hypertext link is a reference to another document stored in the Web. All of the documents are gathered by identifying a few key starting points, retrieving those documents for indexing, retrieving and indexing all documents referenced by the documents just indexed (via hypertext links), and continuing recursively until all documents reachable from the starting points have been retrieved and indexed. The graph of documents in a Web environment is typically well connected, such that nearly all of the available documents can be found when appropriate starting points are chosen.

Having gathered and indexed all of the documents available in the Web environment, the index can then be used, as described above, to search for documents in the Web. Again, the index may be located independently of the documents, the client, and even the search server. A hit-list, generated as the result of searching the index, will typically identify the locations of the relevant documents on the Web, e.g. with hypertext links can be attributes, and the user will retrieve those documents directly with their Web browser.

STATEMENT OF PROBLEMS WITH THE PRIOR ART

When searching document databases with more than one copy or instance of a document, most of the prior art returns multiple instances of a document, i.e., redundant documents.

This is because documents in a collection of documents, particularly in a Web environment, get copied and shadowed. As a result, multiple instances of these duplicated documents become indexed and therefore each instance is returned on the hit-list.

Duplicate/redundant documents on the hit-list are confusing for the user, take up additional display space, and cause some relevant documents not to be displayed to the user. For example, relevant documents with a score below a cutoff may not be displayed if there are many duplicate documents with scores higher than the cutoff taking up space on the display.

These problems are further exacerbated in networking environments where it is common to have copies of the same document in many locations on the network and/or on the same machine on the network. This causes prior art search systems to present all of these many identical instances to the the user in the hit-list.

OBJECTS OF THE INVENTION

An object of this invention is a system and method that identifies duplicate documents from search results without comparing content within the documents.

An object of this invention is a system and method that identifies duplicate documents from search results without comparing content within the documents in order to save the cost of accessing and analyzing the document content.

An object of this invention is a system and method that identifies duplicate documents from search results without comparing content within the documents in a networking environment.

SUMMARY OF THE INVENTION

The present invention is a system of and method executed on one or more computers that has one or more memory storage devices containing a document collection of one or more documents. The system also has one or more indexes that each include an inverted file with one or more terms. Each of the terms is associated with one or more document identifiers. The index further includes a document catalog that associates each of the document identifiers with one or more attributes, either intrinsic or non intrinsic. A search engine process executes on the system and processes a query with one or more query elements. The search engine process produces a hit list having one or more hit list entries. Each hit list entry, with one or more hit list attributes, is associated with one of the documents that is determined by the search engine to be relevant to the query. Each of the hit list attributes is selected or derived from the attributes in the document catalog. A formatter processor selects one or more of the hit list attributes, identified by a hit list attribute selector. The formatter processor then compares the selected attributes of two or more entries on the hit list to determine whether or not documents associated with these entries are duplicate instances of one another. The determination can be made without examining the content of the document associated with the entries.

BRIEF DESCRIPTION OF THE DRAWINGS

The foregoing and other objects, aspects and advantages will be better understood from the following detailed description of preferred embodiments of the invention with reference to the drawings that include the following:

FIG. 1 is a block diagram of the computing environment in which the present invention is used in a non limiting preferred embodiment.

FIG. 3 is a block diagram of a query (FIG. 3A) and a hit-list (FIG. 3B) that might result from processing the query.

FIG. 4 is a flow chart of one preferred embodiment of a process for determining which documents on a hit-list are duplicated.

DETAILED DESCRIPTION OF THE INVENTION

Figure 2B:
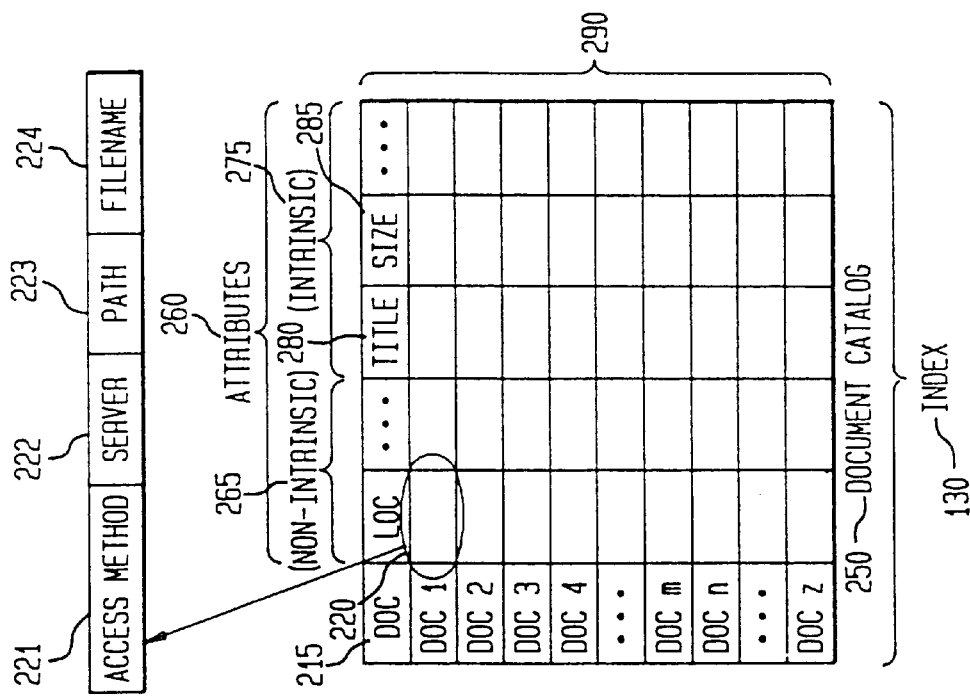
FIG. 2 is a block diagram of an index comprising an inverted file (FIG. 2A) and a document catalog (FIG. 2B) having intrinsic and optionally non intrinsic attributes of each document used in a non limiting preferred embodiment.

FIG. 1 is a block diagram of the computing environment in which the present invention is used in a non limiting preferred embodiment. The figure shows some of the possible hardware, software, and networking configurations that make up the computing environment.

The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM POWERparallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

Documents 140 are items such as books, articles, or reports that contain text, images, or any other multimedia object and/or information. One or more documents are stored on one or more computers in the environment, and multiple instances of the same document may exist in the environment.

To find a particular document in the environment, a query (see FIG. 3A) is submitted for processing to a search engine 120 running on a computer in the environment. The search engine makes use of an index 130 (see FIG. 2) to identify documents that are relevant to the query. An index is created at indexing time by the search engine for a particular set of documents in the environment, called a document collection 141. A document collection 141 may comprise documents located anywhere in the computing environment, e.g., spread across two or more computer memories. The process of using an index to identify documents relevant to a query is called information retrieval, and is well known in the prior art. The relevant documents are returned by the search engine in the form of a hit-list (see FIG. 3B).

Since multiple instances of the same document may exist in the environment, multiple instances of the same document may be indexed, and an entry for each duplicate instance of the same document may appear in a hit-list. A formatter 110, which embodies the present invention, is used to identify hit-list entries for duplicate instances of the same document and make any of a number possible modifications to the hit-list to distinguish these duplicates. The formatter process 110 of identifying duplicates is described in detail in FIGS. 4 and 5.

Documents 140 and/or indexes 130 on one computer may be accessed over the network by another computer using the Web protocol, a networked file system protocol (e.g., NFS, AFS), or some other protocol. Services on one computer (e.g., search engine 120, formatter 110) may be invoked over the network by another computer using the Web protocol, a remote procedure call (RPC) protocol, or some other protocol.

A number of possible configurations for accessing documents, indexes, and services locally or remotely are depicted in the present figure. These possibilities are described further below.

One configuration is a stand-alone workstation 195 that may or may not be connected to a network 105. The stand-alone system 195 has documents 140 and an index 130 stored locally. The stand-alone system 195 also has a search engine 120 and a formatter 110 installed locally. When the system is used, a query is input to the workstation 195 and processed by the local search engine 120 using the index 130. The results from the search engine are formatted by the local formatter 110 and output by the workstation 195.

A second configuration is 185, a workstation with documents and indexes connected to a network 105. This configuration is similar to the stand-alone workstation 195, except that 185 is always connected to the network 105 and the local formatter 110 is optional. Also, the local index 130 may be derived from local documents 140 or remote documents accessed via the network 105, and created by either a local search engine 120 or a remote search engine accessed via the network 105. When queries are input at the workstation 185, they may be processed locally at 185 using the local search engine 120, local index 130, and local formatter 110. Alternatively, the local search engine 120 may access a remote index 130 (e.g. on system 175) via the network 105. Alternatively, the workstation 185 may access a remote search engine 120 via the network 105, and the results may be formatted by either the local formatter 110 or a remote formatter accessed via the network 105.

Another possible configuration is 175, a workstation with index only. Computer 175 is similar to computer 185 with the exception that there are no local documents 140. The local index 130 is derived from documents 140 accessed via the network 105. Otherwise, as in computer 185, the index 130, search engine 120, and formatter 110 may be accessed locally or remotely via the network 105 when processing queries.

Another possible configuration is computer 180, a workstation with documents only. The documents 140 stored locally at computer 180 may be accessed by remote search engines 120 via the network 105. When queries are entered at computer 180, the search engine 120, index 130, and formatter 110 must all be accessed remotely via the network 105.

Another possible configuration is computer 190, a client station with no local documents 140, index 130, or search engine 120. When queries are entered at computer 190, the search engine 120, and index 130 must all be accessed remotely via the network 105. The formatter 110 may be accessed locally or remotely via the network 105.

Another possible configuration is computer 170, a typical web server. Queries are entered at another workstation (e.g., 175, 180, 185, or possibly 195) or a client station (e.g., 190) and sent for processing to the web server 170 via the network 105. The web server 170 uses a remote search engine 120 and index 130 (accessed via the network 105) to process the query. The results are optionally formatted (using a local or a remote formatter 110) and returned to the workstation or client station from which the query was originally sent.

Figure 2A:
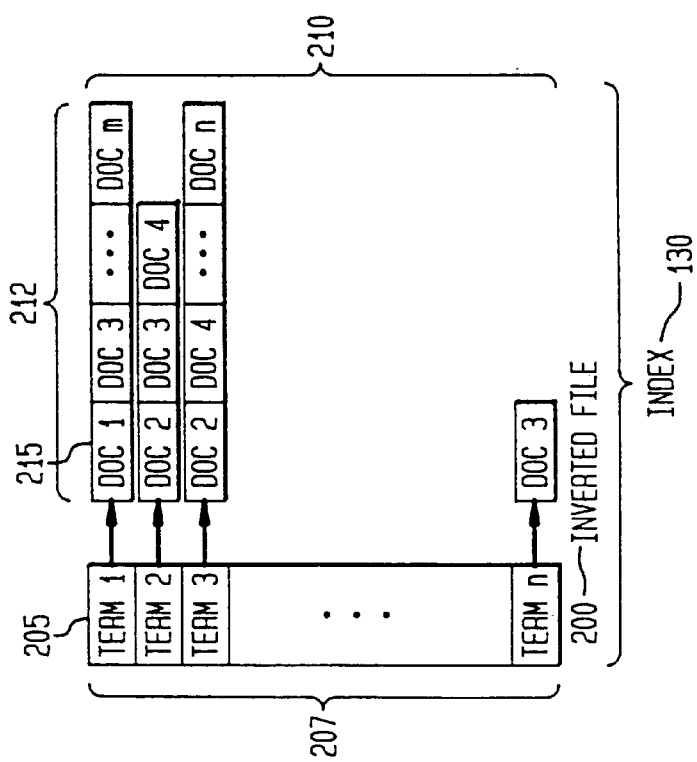

FIG. 2 is a block diagram of an index 130, which comprises an inverted file 200 (FIG. 2A) and a document catalog 250 (FIG. 2B) having intrinsic and optionally non intrinsic attributes of each document used in a non limiting preferred embodiment.

An inverted file 200 (FIG. 2A) contains an inverted list 210 for every unique term 207 in the documents (see 140, FIG. 1) indexed. An inverted list 210 contains an inverted list entry 212 for every document in which the corresponding term appears. An inverted list entry 212 contains, at a minimum, a document identifier 215 that identifies the corresponding document. An inverted list entry 212 may also contain other information, such as a term weight and the location of each occurrence of the term in the document. The terms 207 in an inverted file 200 are typically organized in a dictionary 205, which allows the inverted list 212 for a particular term 207 to be accessed.

The document catalog 250 (FIG. 2B) contains an entry 290 for every document (see 140, FIG. 1) indexed. The entry for a particular document is accessed by looking up the document identifier 215 in the catalog. A document catalog entry stores the attributes 260 of the corresponding document. The attributes 260 are classified as intrinsic (275) or non-intrinsic (265).

Intrinsic attributes 275 are properties of the document that are established at the time the document is created and that are invariant with a location and replication of the document. Intrinsic attributes 275 include properties such as title 280 and size 285.

There are other ways to create intrinsic attributes 275. One or more of the intrinsic attributes can be a score that is a function of one or more other intrinsic attributes. Some of these other intrinsic attribute can be intrinsic attributes based on content of the document. For example, these other intrinsic attributes can include attributes like the following: document length, title, concepts, author, date of publication, and abstract. The function can include any one of the following: probabilistic measures, cosine similarity measures, or other measures known in the art. Typically, the other intrinsic attributes are those intrinsic attributes on the hit-list. One or more of these intrinsic attributes can be a score that is a function of one or more other intrinsic attributes and one or more query elements of a query that is used to generate the hit-list. Examples of these functions include probabilistic measures and/or cosine similarity measures that incorporate one or more intrinsic attributes and one or more query elements to produce a numeric or logical value. The function may also operate on one or more properties that are not intrinsic attributes of the document but that are the same for every document of the hit-list because the properties are properties of the entire collection of documents and are determined at a time of query. Examples of these attributes include query term frequency distribution, size of the collect of documents 141, number of terms 205 used, and other attributes that may be used in the index 130.

Non-intrinsic attributes 265 are properties of the document that vary with respect to one or more document instance. Non-intrinsic attributes 265 include properties such as location 220. An example of a location 220 is a World Wide Web (WWW) Uniform Resource Locator (URL) (e.g., "http://www.farmers.com/brown/news/624.html"). A URL consists of an access method 221 (e.g., "http://"), a server 222 (e.g., "www.farmers.com"), a path 223 (e.g., "/brown/news/"), and a filename component 224 (e.g., "624.html"). Typically, the filename component is the last component in a networking environment.

The inverted file 200 and document catalog 250 together comprise the index 130. The index 130 is created at indexing time by the search engine (see 120 in FIG. 1). The search engine 120 then uses the index to process a query (see FIG. 3A) and produce a hit-list ( see FIG. 3B). During query processing, the search engine accesses the inverted file 200 and decides which documents to place in the hit-list. For each document that will appear in the hit-list, the document's identifier 215 is obtained from the inverted file 200 and used to locate the document's entry 290 in the document catalog 250. Certain attributes are obtained from the entry 290 and added to the hit-list (see FIG. 3B).

FIG. 3 is a block diagram of a typical query (FIG. 3A) and a typical hit-list (FIG. 3B) resulting from processing the query.

A query 300 is an expression of an information need and consists of query elements 310. In FIG. 3A, the query elements are "effects", "of", "acid", "rain", "on", "cucumber", and "farming." A query 300 is processed by a search engine (see 120, FIG. 1) using one of a number of possible information retrieval algorithms known in the prior art.

The result of processing a query 300 is a hit-list 350. One hit-list 350 that might result from processing the query in FIG. 3A is shown in FIG. 3B. A hit-list 350 consists of hit-list entries 355, one for each document 140 that is identified by the information retrieval algorithm as relevant to the query. A hit-list entry 355 contains one or more hit list attributes 360, some of which are obtained from the document catalog entry 290 for the corresponding document.

The hit list attributes 360 are classified as intrinsic 370 or non-intrinsic 380. (See FIG. 2 for further details on intrinsic and non-intrinsic attributes. Note, however, that the sets of hit list attributes 360, 370, and 380 are distinct from the sets of attributes 260, 265, and 275.) Non-intrinsic attributes 380 include items such as location 220 (see FIG. 2B). Location is obtained directly from the document catalog entry 290. Intrinsic attributes 370 include items such as relevance score 375, title 280, and size 285. Title 280 and size 285 are obtained directly from the document catalog entry 290. The relevance score 375 for a particular document is calculated by the information retrieval algorithm as a function of the query, the contents of the document, and the contents of the indexed document collection that contains the document. The query and document collection are constant for all entries in the hit-list, so within a given hit-list, differences in relevance score result solely from differences in document content. Since document content is intrinsic to the document, the relevance score on a hit-list is intrinsic to the document.

The hit-list 350 contains a novel entry 365, called a hit list attribute selector, which is used by the formatter 130 as described below in FIGS. 4 and 5. Each hit-list entry (except 365) also contains an additional novel field 390, a duplicate identifier field 390, which is used by the formatter 110 for marking duplicates as described below in FIGS. 4 and 5.

The hit list attribute selector 365, typically is a record of selector flags, e.g. 366. Each selector flag 366 designates whether or not a particular hit list attribute 360 is selected by the processes described below (FIGS. 4 and 5).

There is typically one duplicate identifier field 390, for each hit list entry 355. When an entry 355 is identified as having one or more duplicates, specifically when a pair of entries is identified as being duplicates, the entry number 377 of each duplicate entry 355 is cross referenced in the duplicate identifier field 390 of the other duplicate.

Figure 7:
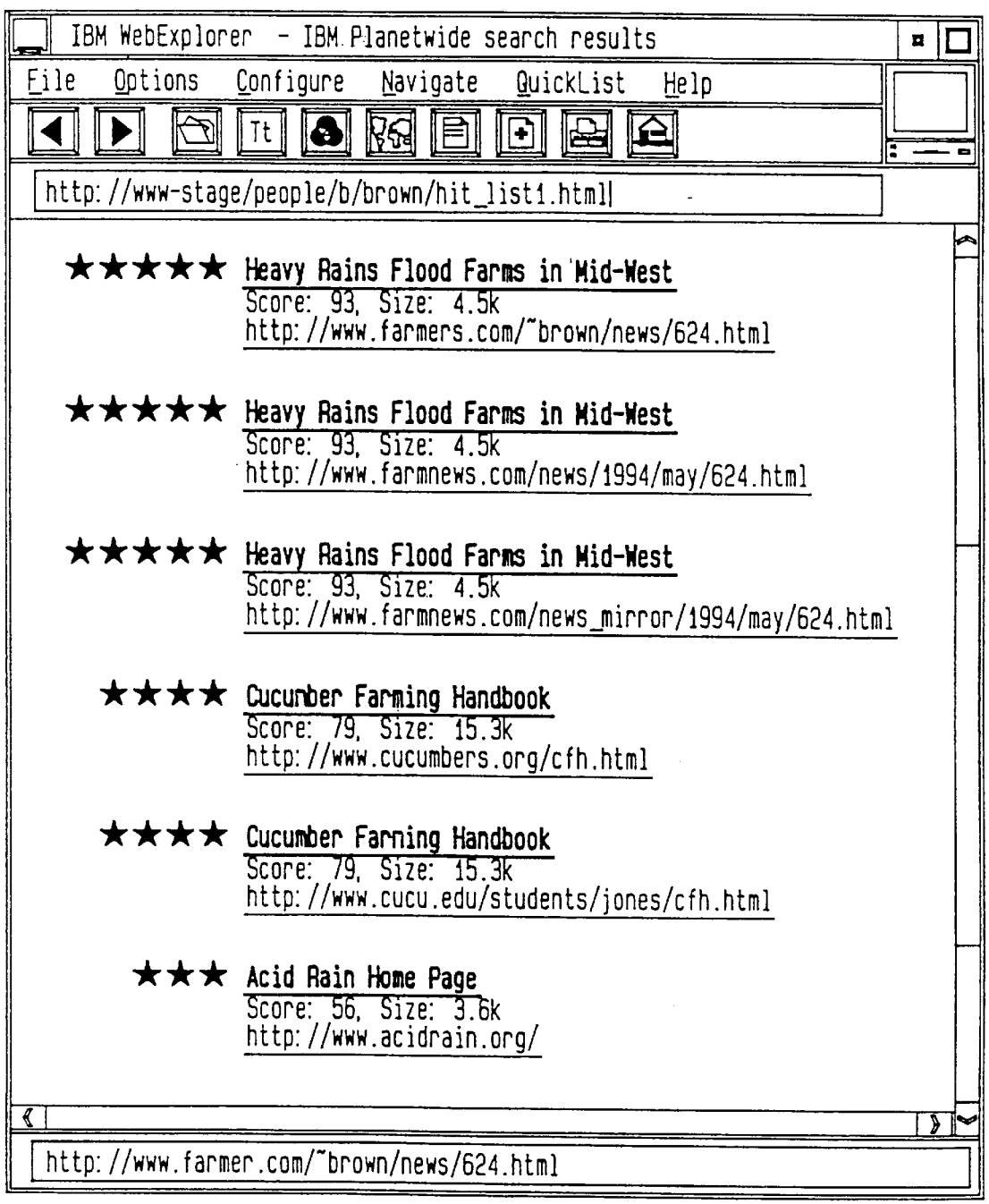
FIG. 7 shows a typical hit-list before being processed by the present invention.

FIG. 4 is a flowchart showing the method steps of the one preferred embodiment of the present invention. By executing the process 400, the formatter 110 takes hit-list 350, as depicted in FIG. 7, and can produce either a hit-list with duplicates deleted (FIG. 8) or coalesced (FIG. 9). See below.

The process begins in step 405 with the selection of intrinsic attributes 370 and optionally non-intrinsic attributes such as location 220 for later comparison. This selection can be done at any of a number of times: it can be hard wired into the program which implements process 400, it can be supplied as a run-time parameter when the program is invoked, it can be done by the program based on user profiles or it can be selected by the user at the time he/she initiates the process by making a query. The selection causes fields to be set to 1 or 0 in the attribute-active flags structure 365.

In step 410, a list of all possible unordered permutations of distinct pairs of hit-list elements 355 is generated. Each pair will be processed in turn in subsequent steps. In step 415 it is determined if there is another pair of elements, denoted 355a and 355b, for comparison. If no, branch 416 is taken; if yes, branch 417 is taken.

In step 420 a list of intrinsic attributes 370a for which the attribute-active flag 365 is set to 1 is generated. Each attribute will be processed in turn in subsequent steps. In step 425 it is determined if there is another attribute 370a for processing. If so, branch 427 is taken; otherwise it has been established that all intrinsic attributes selected in 405 are equal in the two hit-list elements 355a and 355b, and branch 426 is taken.

In step 430 it is determined if the values of attribute 370a in the two elements 355a and 355b are equal. If they are not, branch 431 is taken, and it is noted in step 455 that the two elements 355a and 355b cannot be duplicates. Step 455 will normally be the null operation. If in step 430 the elements 355a and 355b are equal, branch 432 is taken.

If any non-intrinsic attributes have been selected in step 405, then sub-process 435 is executed; otherwise branch 426 leads directly to step 460.

The first step in subprocess 435 is step 440, in which a list of non-intrinsic attributes 370a for which the attribute-active flag 365 is set to 1 is generated. Each attribute will be processed in turn in subsequent steps. In step 445 it is determined if there is another attribute 370a for processing. If so, branch 447 is taken; otherwise it has been established that all non-intrinsic attributes selected in 405 are equal in the two hit-list elements 355a and 355b, and branch 446 is taken.

In step 450, it is determined if the comparison test appropriate to the attribute selected is passed. If the attribute is location, then the comparison test is as follows. The location attribute has a filename component 224 which is the portion of the location string 220 to the right of the rightmost '/' (forward-slash), in usual URL notation. The filename components of the two hit-list elements under consideration will be denoted 224a and 224b.

If components 224a and 224b are equal, the test is passed.

If components 224a and 224b are both null, the test is passed.

If either component 224a or 224b is null, and the other component is one of the strings 610 in array 600, then the test is passed. If the test 450 is failed, then branch 451 is taken, since the elements 355a and 355b cannot be considered duplicates. If the test 450 is passed, then branch 452 is taken.

In step 460 elements 355a and 355b are tagged as being duplicates of each other in field 390 of hit-list 350.

Figure 9:
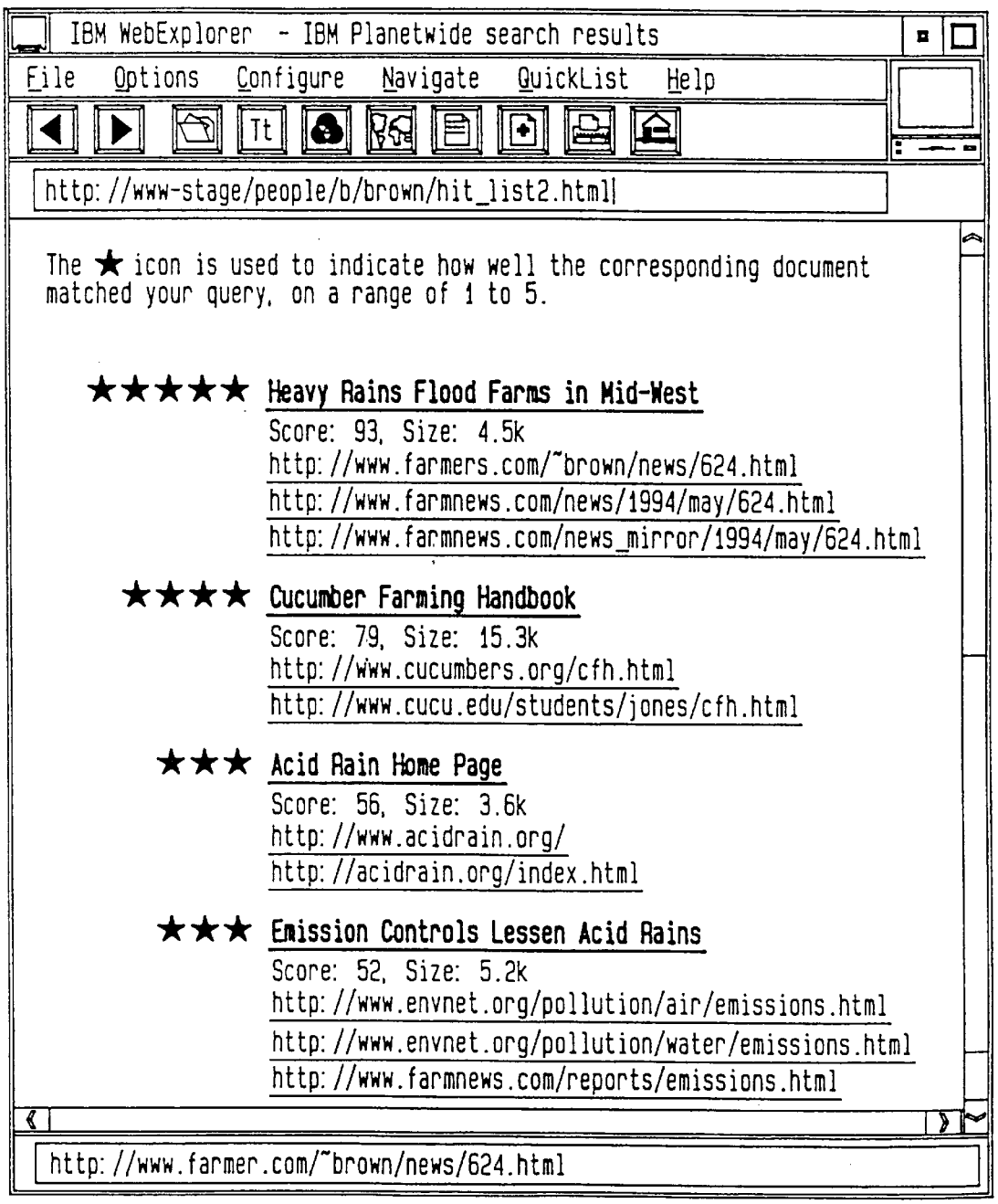
FIG. 9 shows an alternative possible result of applying the present invention to the hit-list shown in FIG. 7 in a non limiting preferred embodiment.
Figure 10:
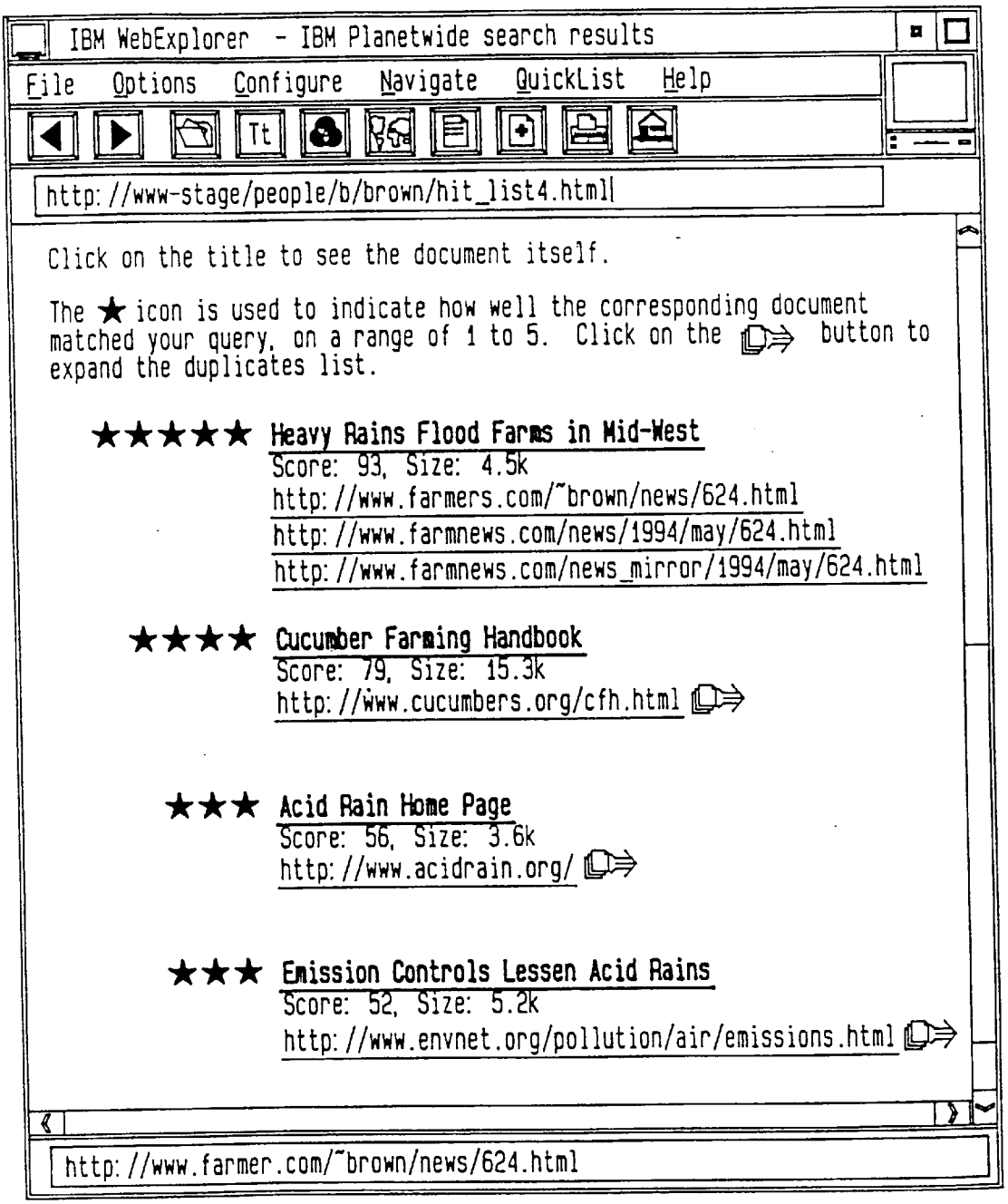
FIG. 10 shows another alternative possible result of applying the present invention to the hit-list shown in FIG. 7 in a non limiting preferred embodiment.

In step 465 the information in the hit list 350 is displayed on a user interface to the user. For example, see displays in FIGS. 7–10. Once the hit list entries 355 are identified as duplicates in the duplicate identifier field 390, these displays can be created by well known techniques. For example, the resulting display will either be as in FIG. 8, with all but one of the hit-list elements tagged as duplicates deleted. In FIG. 9, the duplicates are coalesced, i.e., all common attributes of the duplicates are displayed once and the differing attributes of each duplicate (like the location) are also displayed with the common attributes. An optional variation has all but one duplicate initially suppressed from view, but the user is given a button to press next to each hit-list item that has duplicates. Pressing this button causes the duplicates, identified in the duplicate identifier field 390, to be displayed, preferably in the coalesced style. This is depicted in FIG. 10.

Figure 5:
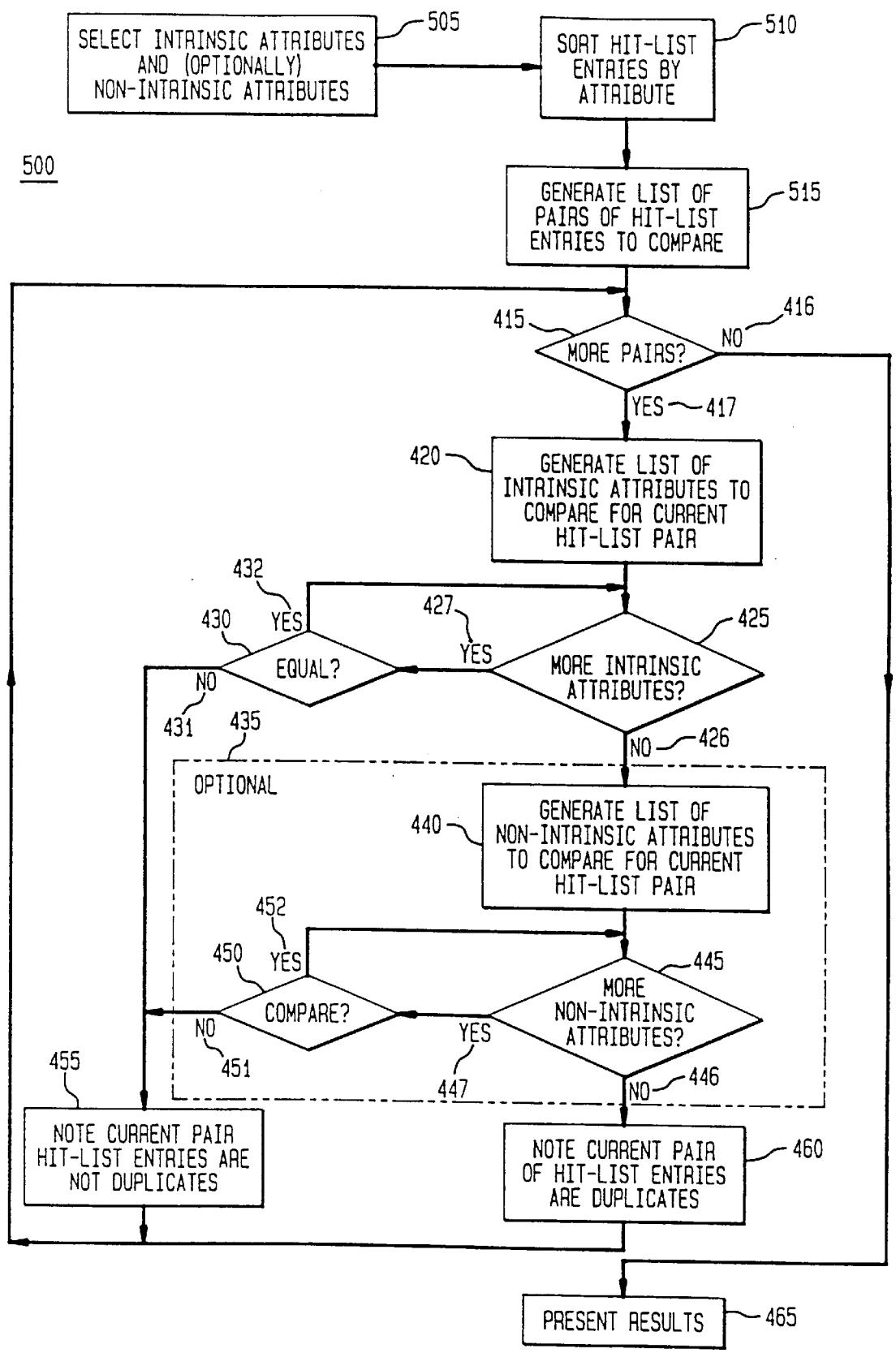
FIG. 5 is a flow chart of an alternative preferred embodiment of a process for determining which documents on a hit-list are duplicated.

FIG. 5 is a flowchart showing the method steps of an alternative preferred process executed by the present invention. The process 500 is identical to process 400, except for the following steps.

In step 505, the ranking score and the document title are selected intrinsic attributes, marked so in the attribute-active flags structure 365. The document location is a selected non-intrinsic attribute marked in structure 365. The selection (or not) of other attributes is optional.

In step 510, the hit-list 350 is sorted with respect to all attributes selected in step 505, e.g., the attributes are used as sort keys. In one embodiment, the primary sort is rank, secondary is document title, followed by any and all other selected intrinsic attributes. Next sort key is the filename component of document location, followed finally by any and all other selected non-intrinsic attributes. The sorted hit-list will be denoted 350a.

In step 515, a list of all consecutive pairs of hit-list elements 355 in the sorted hit-list 350a is generated. Each pair will be processed in turn in subsequent steps.

Figure 6:
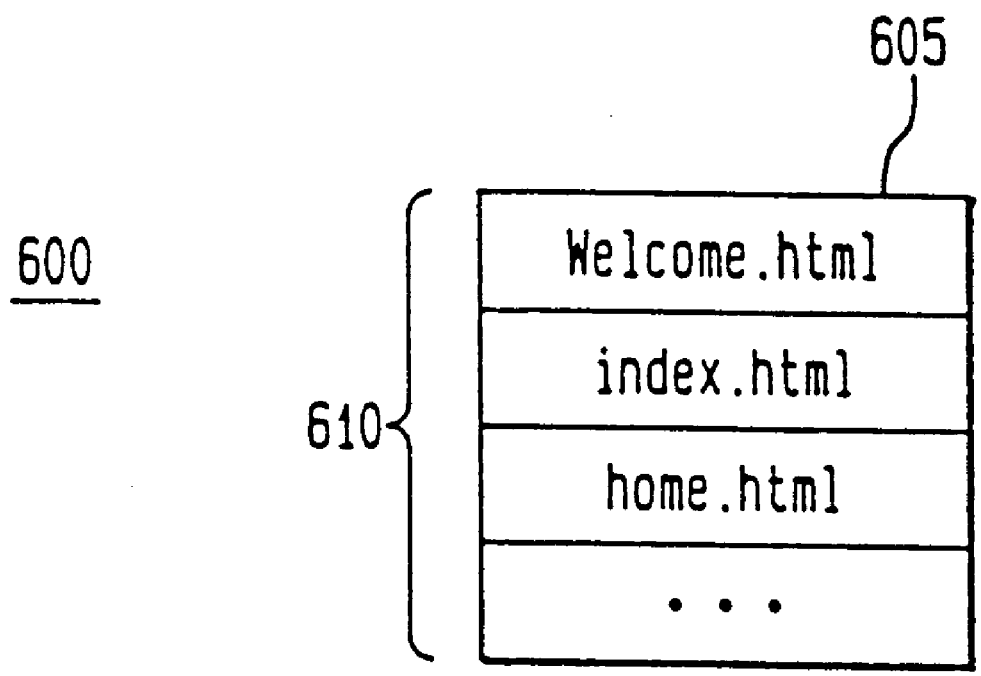
FIG. 6 is a block diagram of a filename-string data structure used by the present invention in a non limiting preferred embodiment.

FIG. 6 depicts an optional equivalence structure 600 used for comparison in step 450. This structure lists attributes that are considered equivalent, even though they may not have the same character string. In a preferred embodiment, this equivalence structure 600 is used to identify values for the filename attribute 224 which are defined as being equivalent. Therefore, the entries 610 in the equivalence structure 600 contain the filename-strings 610 indicating the location of documents 140 that are defined as equivalent. This is useful because not only are documents with identical filename strings 224 equivalent, but often documents 140 with different filename strings 224 are also known to be equivalent. These equivalent filename strings 224 are listed as equivalent in the equivalence structure 600. These names are those which typical Web-servers 170 conventionally assume are implied (e.g. index, home, and welcome) when URLs are issued with null filename components 224. The actual values used will depend on the conventions in force at the time of implementation. The most common such names are those shown in FIG. 6.

FIG. 7 shows a display of a typical hit-list before the present invention. This hit-list exhibits two duplicates of the first article "Heavy Rains Flood Farms in Mid-West", and one duplicate of the next article "Cucumber Farming Handbook". The display is generated by step 465 of the algorithms described in FIGS. 4 and 5. For each hit-list entry 355, the title attribute 280, score attribute 375, size attribute 285, and location attribute 220 from the hit-list data structure 350 are formatted and displayed on the user interface using well known techniques.

Figure 8:
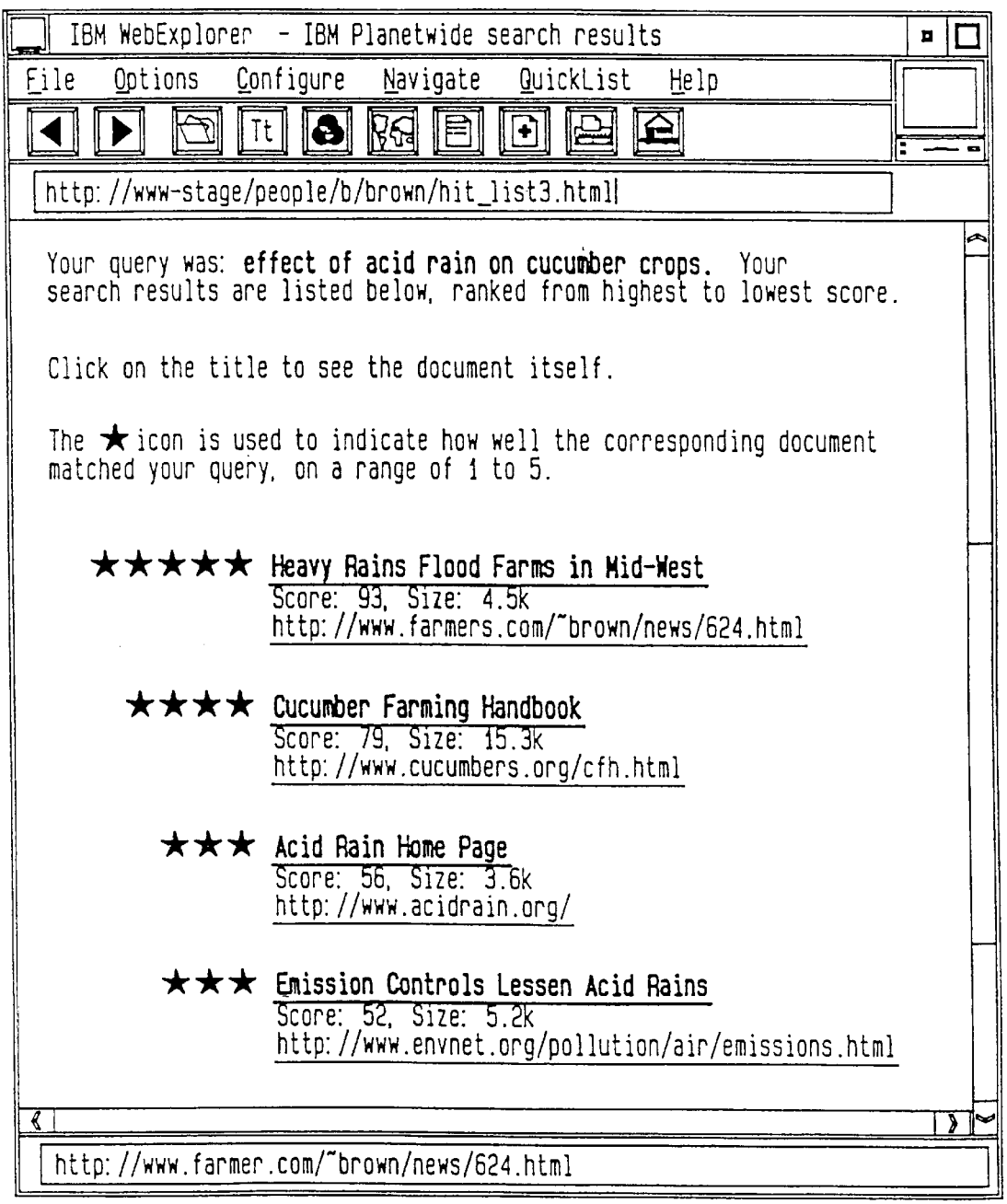
FIG. 8 shows a possible result of applying the present invention to the hit-list shown in FIG. 7 in a non limiting preferred embodiment.

FIG. 8 shows the displayed result of applying the present invention to the hit-list shown in FIG. 7, with the decision made to delete duplicates. This decision is made in step 465 of the algorithms described in FIGS. 4 and 5. As each hit-list entry 355 in the hit-list data structure 350 is formatted for display, if the duplicate identifier field 390 for the current hit-list entry indicates that this entry is a duplicate of the previously displayed hit-list entry, then the current hit-list entry is not displayed. Otherwise, the hit-list entry is formatted and displayed as in FIG. 7.

FIG. 9 shows the result of applying the present invention to the hit-list shown in FIG. 7, with the decision made to coalesce duplicates. This decision is made in step 465 of the algorithms described in FIGS. 4 and 5. As each hit-list entry 355 in the hit-list data structure 350 is formatted for display, if the duplicate identifier field 390 for the current hit-list entry indicates that this entry is a duplicate of the previously displayed hit-list entry, then only the location attribute 220 for the current hit-list entry is displayed. Otherwise, the hit-list entry is formatted and displayed as in FIG. 7.

FIG. 10 shows the result of applying the present invention to the hit-list shown in FIG. 7, with the decision made to suppress duplicates from view, but to supply a button which if clicked will allow the duplicates to be shown in coalesced mode. This Figure shows the state of the display after the button has been clicked for the first article "Heavy Rains Flood Farms in Mid-West". This formatting takes place in step 465 of the algorithms described in FIGS. 4 and 5. The initial formatting and display is done as for FIG. 8, except that a button is additionally displayed for hit-list entries that have duplicates. When this button is pressed, the display format for the current hit-list entry is changed to the display format shown in FIG. 9.

Given this disclosure alternative equivalent embodiments will become apparent to those skilled in the art. These embodiments are also within the contemplation of the inventors.

We claim:

1. A method of automatically determining duplicate documents on a hit-list containing one or more duplicate documents and document instances, the hit-list having a hit-list record for each instance of the documents, each hit-list record having one or more attribute fields, each attribute field containing one or more attributes of the documents, the method comprising the steps of:

selecting one or more of the attributes that are intrinsic attributes, the intrinsic attributes being established at a time of document creation and that are invariant with a location and replication of the document;

generating a pair of the hit-list records associated with the documents and intrinsic attributes;

comparing one or more of the intrinsic attributes of the pair of hit-list records;

using the comparison of the intrinsic attributes of the pair of hit-list records to determine if the documents are instances of the same document.

2. A method, as in claim 1, further comprising the steps of:

repeating steps a through c for one or more pairs of hit-list records, each pair of hit-list records associated with a pair of compared documents, and noting that compared documents with attributes that are not equal are not instances of the same document;

determining that documents in the pair that are not noted are duplicate instances of one another.

3. A method, as in claim 1, where one of the intrinsic attributes is a score that is a function of one or more other intrinsic attributes.

4. A method, as in claim 3, where the other intrinsic attributes are those intrinsic attributes based on content of the document.

5. A method, as in claim 4, where the other intrinsic attributes include any one of the following: document length, title, concepts, author, date of publication, and abstract.

6. A method, as in claim 3, where the function includes any one of the following: probabilistic measures, cosine similarity measures.

7. A method, as in claim 3, where the other intrinsic attributes are those intrinsic attributes on the hit-list.

8. A method, as in claim 1, where one of the intrinsic attributes is a score that is a function of one or more other intrinsic attributes and one or more query elements of a query that is used to generate the hit-list.

9. A method, as in claim 8, where the score also includes a portion that is based on properties that are not intrinsic attributes of the document but that are the same for every document of the hit-list because the properties are properties of the entire collection of documents and are determined at a time of query.

10. A method of automatically determining duplicate documents on a hit-list containing one or more documents and document instances, the hit-list having a hit-list record for each instance of the documents, each hit-list record having one or more attribute fields, each attribute field containing one or more attribute of the documents, the method comprising the steps of:

selecting one or more of the attributes that are intrinsic attributes, the intrinsic attributes being established at a time of document creation and that are invariant with a location and replication of the document;

generating a pair of the hit-list records associated with the documents and the intrinsic attributes;

comparing one or more of the intrinsic attributes of the pair of hit-list records selecting one or more of the attributes that are non intrinsic attributes, the non intrinsic attributes being variable with one or more document instance;

comparing one or more of the non intrinsic attributes of the pair of hit-list records previously compared;

noting that the pair of hit-list records failing a comparison test of the comparing of the intrinsic and non intrinsic attributes results in instances of not the same document.

11. A method, as in claim 10, further comprising the steps of:

repeating steps a through for one or more pairs of hit-list records;

f. determining that documents in the pair that are not noted are duplicate instances of one another.

12. A method, as in claim 10, where one of the non intrinsic attributes is document location that includes a file name component.

13. A method, as in claim 12, where the comparison test is whether the file name component of the pair are equivalent.

14. A method, as in claim 12, where the file name component is last component of a URL in a network environment.

15. A method, as in claim 12, where the file name component is an implicit last component of a URL in a network environment.

16. A method of automatically determining duplicate documents on a hit-list containing one or more documents and document instances, the hit-list having a hit-list record for each instance of the documents, each hit-list record having one or more attribute fields, each attribute field containing an attribute of the documents, the method comprising the steps of:

a. selecting one or more of the attributes that are intrinsic attributes, intrinsic attributes being attributes that are established at a time of document creation and that are invariant with a location and replication of the document;

b. sorting the hit-list using all of the intrinsic attributes as sort keys;

c. comparing one or more intrinsic attributes of one or more of the adjacent documents on the sorted hit-list; and d. noting that documents with attributes that are not equal are not instances of the same document.

17. A method, as in claim 16, where an additional sort key includes a non intrinsic attribute that is file name.

18. A computer system of one or more computers comprising:

one or more memory storage devices containing a document collection of one or more documents;

an index including an inverted file with one or more terms, each term associated with one or more document identifiers, the index further including a document catalog that associates each of the document identifiers with one or more attributes;

a search engine process that processes a query with one or more query elements to produce a hit list having one or more hit list entry, each hit list entry associated with one of the documents that is determined by the search engine to be relevant to the query;

one or more hit list attributes associated with each of the hit list entries, each of the hit list attributes being one of the attributes; and a formatter processor that identifies duplicate hit list entries by selecting one or more of the hit list attributes as selected attributes, identified by a hit list attribute selector, the formatter processor further selecting two or more hit list entries, called compared entries, that are each associated with one of the documents, each called a compared document, and the formatter process comparing the selected attributes to determine if the compared documents are duplicate instances of one another.

19. A computer system, as in claim 18, where there is one computer that is a single stand alone work station including the memory storage devices, the index, the search engine process, the hit list attributes, and the formatter processor.

20. A computer system, as in claim 19, where the single stand alone work station is connected to a network.

21. A computer system, as in claim 20, where the single stand alone work station can be disconnected from the network.

22. A computer system, as in claim 18, where one or more of the computers is a client on a network and one or more of the computers is a server on the network.

23. A computer system, as in claim 22, where one or more of the servers has one of the memory storage devices with one or more of the documents.

24. A computer system, as in claim 22, where one or more of the servers has the formatter processor.

25. A computer system, as in claim 24, where one or more of the servers further has one or more indexes and the search engine processor.

26. A computer system, as in claim 22, where one or more of the clients has the formatter processor.

27. A computer system, as in claim 18, where one or more of the selected attributes is an intrinsic attribute, intrinsic attributes being attributes that are established at a time of document creation and that are invariant with a location and replication of the document.

28. A computer system, as in claim 27, where the intrinsic attributes include any one or more of the following: title and document size.

29. A computer system, as in claim 27, where one or more of the selected attributes is a non intrinsic attribute, non intrinsic attributes being attributes that vary with respect to one or more document instance.

30. A computer system, as in claim 29, where one of the non intrinsic attributes include is a document location that includes a file name component.

31. A computer system, as in claim 30, where the file name component is last component of a URL in a network environment.

32. A computer system, as in claim 30, where the file name component is an implicit last component of a URL in a network environment.

33. A computer system, as in claim 18, where one or more of the selected attributes is a function of one or more other attributes.

34. A computer system, as in claim 18, where a duplicate field is associated with one or more of the hit list entries and the formatter processor uses the duplicate field to mark whether or not the hit list entry is a duplicate.

35. A computer system of one or more computers comprising: one or more memory storage devices containing a document collection of one or more documents;

an index including an inverted file with one or more terms, each term associated with one or more document identifiers, the index further including a document catalog that associates each of the document identifiers with one or more attributes;

search engine process means for processing a query with one or more query elements to produce hit list means having one or more hit list entries, each hit list entry associated with one of the documents that is determined by the search engine to be relevant to the query;

one or more hit list attributes means for identifying the documents and associated with each of the hit list entries, each of the hit list attributes being one of the attributes; and formatter processor means for identifying duplicate hit entries by selecting one or more of the hit list attributes as selected attributes, identified by a hit list attribute selector, the formatter processor means further selecting two or more hit list entries, called compared entries, that are each associated with one of the documents, each called a compared document, and the formatter process comparing the selected attributes to determine if the compared documents are duplicate instances of one another.

* * * * *